3,031,512
UNSATURATED ALIPHATIC ALCOHOLS
John Mervyn Osbond and Peter George Philpott, Welwyn Garden City, Herts, England, assignors to Hoffmann-La Roche Inc., Nutley, N.J., a corporation of New Jersey
No Drawing. Filed June 30, 1959, Ser. No. 823,845
Claims priority, application Great Britain July 5, 1958
5 Claims. (Cl. 260—632)

The present invention relates to unsaturated aliphatic compounds. More particularly, the invention relates to novel unsaturated alcohols, to a process for the manufacture and conversion of same and to the compounds obtained according to the conversion process.

The novel unsaturated alcohols provided by the present invention are substances of the general formula

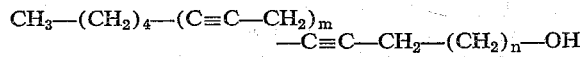

wherein $m$ stands for an integer of from 1 to 4 and $n$ stands for an integer of from 0 to 8, and such compounds in which the triple bonds are replaced by double bonds.

The following compounds are illustrative of the unsaturated alcohols included within the invention: undecadiyn - (2,5) - ol - (1), tetradecatriyn - (2,5,8)-ol-(1), eicosatetrayn - (5,8,11,14)-ol-(1), nonadecatetrayn-(4,7,10,13)-ol-(1).

The process provided by the invention comprises reacting a halogeno compound having the general formula

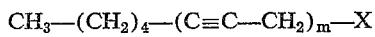

wherein $m$ has the meaning indicated above and X represents a chlorine, bromine or iodine atom, in the presence of a cuprous salt with an alcohol having the general formula

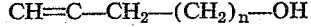

wherein $n$ has the meaning indicated above, in a Grignard reaction and, if desired, subjecting the reaction product obtained having the general formula

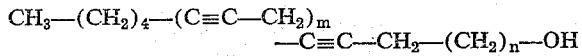

wherein $m$ and $n$ have the meaning indicated above, in any desired sequences to one or more reaction steps comprising partial hydrogenation of the triple bonds to double bonds and halogenation by means of phosphorus trichloride or bromide or iodide, followed by carbonation of the halogen compound formed.

The condensation is carried out by first making a halogeno-magnesium derivative of the alcohol starting material and then reacting this derivative with the halogeno compound in the presence of a cuprous salt, e.g. cuprous chloride or, preferably, cuprous cyanide. Preferably the haolgeno-magnesium derivative is prepared in tetrahydro-furan as a solvent and at a low temperature, e.g. 0° C. It is preferred to use an alkyl-magnesium halide for the preparation of the halogeno-magnesium derivative. It is necessary to use the alkyl-magnesium halide in a twice molecular proportion as the alcohol group also reacts therewith. The derivative is then added to the halogeno compound in the presence of the cuprous salt in tetrahydro-furane and the reaction is carried out at reflux temperature. The reaction is expediently carried out in a nitrogen atmosphere.

In the optional conversion step of transforming the alcohols to the corresponding acids, the halogenation is preferably carried out in an inert solvent, such as diethyl ether. It is advisable to include with the reactants an acid binding agent, such as pyridine. By way of example, a solution of nonadecatetraynol in diethyl ether containing a small quantity of pyridine is treated portionwise with the solution of phosphorus trihalide in diethyl ether and the reaction is completed by heating under reflux for some hours.

The optional carbonation step can be effected for example by reacting the halide with magnesium and carbonating the magnesium-containing compound formed. In this step, it is advantageous to add the halide to the magnesium while the latter is in the process of reacting with a lower alkyl halide. This reaction by entrainment is best conducted in diethyl ether as a solvent or diluent. The reaction may also be conducted using active magnesium, e.g. Gilman's copper-magnesium alloy [Rec. Trav., 47 (1928), 19] in the presence of a minor proportion of a lower alkyl halide.

Also the steps of halogenation and carbonation described above may advantageously be carried out in an inert atmosphere since both the starting materials and the products are subject to oxidation.

The reduction of the unsaturated alcohols and acids provided by the invention to yield the corresponding compounds in which each of the acetylenic bonds are replaced by ethylenic bonds may be accomplished by hydrogenation using a catalyst that selectively catalyzes the reduction of triple bonds to double bonds. The convenient catalysts are lead-inhibited palladium catalysts known as Lindlar catalysts.

The halogeno compounds used as starting materials may all be prepared from pentyl bromide and propargyl alcohol. Thus, octyn-(2)-yl bromide can be prepared by heating pentyl bromide with a di(magnesium bromide) derivate of propargyl alcohol in the presence of cuprous chloride and halogenating the resulting octyn-(2)-ol-(1) with the appropriate phosphorus trihalide. Similarly, the higher molecular weight halogeno compounds are prepared stepwise from the lower molecular weight compounds. The 1-bromo-octyne-(2) can also be prepared by reacting acetylene with amyl bromide in liquid ammonia, condensing the resulting heptyne-(1) with formaldehyde in a Grignard reaction, hydrolyzing the resulting magnesium bromide derivative of octyn-(2)-ol-(1) and treating the so-formed alcohol with phosphorus tribromide in the presence of pyridine.

The unsaturated alcohols provided by the present invention are valuable in that they may be used as intermediates in the synthesis of the corresponding acids, which are essential fatty acids. A deficiency of such acids may cause functional disorders, which may be cured by adding said acids to foods and feedstuffs. The acids can also be used in the therapy of pathologic, inflammatory or scaly skin disorders and for the treatment of arteriosclerosis. The alcohols show superiority over the corresponding acids, since, on the one hand, their transformation into the acids takes place in the organism and, on the other hand, they are perorally and parenterally better resorbed than the acids. Especially for the treatment of inflammatory disoders the alcohols are superior to the acids for they less irritate the skin.

The invention is further disclosed in the following examples, which are illustrative but not limitative thereof. All temperatures are stated in degrees centigrade.

Example 1

To 389 ml. (0.75 mole) of a 1.928 N standard ethereal solution of ethyl magnesium bromide were added 300 ml. of dry peroxide-free tetrahydro-furan and the ether removed by distillation. A solution of 22.4 g. (0.4 mole) of propargyl alcohol in 20 ml. of tetrahydro-furan was added dropwise, with stirring at 0° over 1 hour. The mixture was stirred at room temperature for 2 hours and then heated under reflux for 2 hours. The reaction mixture was cooled, 0.9 g. of cuprous chloride added and the whole stirred for ½ hour. 47.25 g. (0.25 mole) of 1-bromo-octyne-(2) in 20 ml. of tetrahydro-furan were added thereto over ½ hour and the reaction mixture heated under reflux under nitrogen for 24 hours, when a further portion of cuprous chloride (0.4 g.) was added and the heating under reflux continued for a further 36 hours. The tetrahydro-furan was removed under vacuum and the residue treated with ice and sulphuric acid, extracted three times with ether and the extracts washed with sodium carbonate solution, water, and dried over sodium sulphate and sodium carbonate. The ether was evaporated and the residue distilled. Yield 33.7 g. (82%) of undecadiyn-(2,5)-ol-(1);

B.P.=78°–86°/2.9×10⁻³

$n_D^{20}$=1.4825.

The 1-bromo-octyne-(2) used as starting material can be produced according to the following procedure: 6 litres of liquid ammonia were saturated with acetylene by passage of acetylene gas into the liquid for 30 minutes. While continuing the passage of acetylene through the solution and stirring, 161 g. of sodium (7 moles) were added portionwise over a period of 3 hours. The colour of the solution became deep blue with each addition and, when this faded to white, further sodium was added. When the addition was complete the mixture was stirred for a further 30 minutes and the passage of acetylene stopped. 1057 g. of amyl bromide (7 moles) were added dropwise over 3 hours and the mixture stirred for a further 6 hours. The ammonia was allowed to evaporate until the volume was considerably reduced (e.g. to 2.5 l.) when 1500 ml. of dilute ammonium hydroxide solution were added slowly, followed by 1500 ml. of water. The aqueous phase was separated and the crude product washed with 150 ml. of water, 120 ml. of 6-N hydrochloric acid and 150 ml. of 2-N sodium carbonate solution. After drying over potassium carbonate/sodium sulphate, the product was distilled at atmospheric pressure; yield 573.6 g. (85.5%), B.P.=98°–105°, $n_D^{22}$=1.4095, of heptyne-(1).

Ethyl magnesium bromide was prepared by addition of 786 g. (7.2 moles) of ethyl bromide in 600 ml. of dry ether to 174 g. of magnesium turnings in 1200 ml. of dry ether dropwise over 7 hours with stirring, so that gentle reflux was maintained. The solution was decanted from excess magnesium turnings. 690 g. of heptyne-(1) (7.2 moles) were added dropwise to the ethyl magnesium bromide solution over 2 hours, then stirred for a further hour and finally heated under reflux for 2 hours. 330 g. of paraformaldehyde were heated at 180–190° and the resulting formaldehyde gas passed into the flask containing the vigorously stirred heptynyl magnesium bromide solution at 0°. The operation was completed in about 4 hours. The resulting mixture was poured onto 1900 ml. of 4-N sulphuric acid and ice and the acid mixture extracted twice with 1 litre of ether and the extracts dried over potassium carbonate. The ether was evaporated off and the residue distilled through a short Vigreux column; yield of octyn-(2)-ol-(1) 711.3 g. (78.6%); B.P.=95–110°/35 to 13 mm., $n_D^{25}$=1.4545.

To a stirred solution of 697.5 g. (5.54 moles) of octyn-(2)-ol-(1) in 900 ml. of dry ether and 112 ml. of dry pyridine were added dropwise, with cooling, 20.3 ml. (2.21 moles) of phosphorus tribromide over 50 minutes. The mixture was heated under reflux for 3 hours, cooled and added to 2.25 litres of ice water with stirring. The mixture was extracted with ether (3 × 700 ml.) and the combined extracts dried over calcium chloride, filtered and the ether removed by distillation. The residue was distilled to give a yield of 820 g. (78.4%); B.P.=48°–56°/0.15 mm., $n_D^{20}$=1.4887, of 1-bromo-octyne-(2).

*Example 2*

178.6 ml. (0.344 mole) of 1.928-N ethereal ethyl magnesium bromide was concentrated by distilling off 100 ml. of ether. The residue was cooled and 100 ml. of dry peroxide-free tetrahydro-furan was added. 10.29 g. (0.1836 mole) of propargyl alcohol in 20 ml. of tetrahydro-furan were added dropwise over 1 hour to the stirred solution at 0°. The reaction mixture was stirred at room temperature for 1.5 hours and then heated under reflux for 1¾ hours. Evolution of ethane was slightly less than theoretical. The mixture was cooled, 0.9 g. of cuprous chloride were added and the whole stirred for ½ hour. 26.06 g. of undecadiyn-(2,5)-yl bromide in 20 ml. of tetrahydro-furan were added over ½ hour with stirring and then heated under reflux for a total of 60 hours under nitrogen, a further amount of cuprous chloride (0.4 g.) being added after 24 hours. The tetrahydro-furan was removed under vaccum and the residue added to ice and sulphuric acid and extracted three times with ether. The ether extract was washed with sodium carbonate solution and water and then dried over sodium sulphate and potassium carbonate. The ether was removed and a brown oil remained (27 g.). The oil was dissolved in petroleum (40–60°) and cooled in an acetone/carbon dioxide bath, whereupon the alcohol crystallised out and was filtered off and dried in a desiccator over 16 g. of paraffin wax; tetradecatriyn-(2,5,8)-ol-(1) melted at 27.5–29.5°.

The undecadiyn-(2,5)-yl bromide used as starting material can be produced according to the following procedure: 28.97 g. of undecadiyn-(2,5)-ol-(1) (obtained according to the method described in Example 1) were dissolved in 125 ml. of ether and 0.45 g. of pyridine. To the stirred solution at room temperature were added dropwise over ½ hour 17.24 g. of phosphorus tribromide, the reaction heat just keeping the ether under reflux. The reaction mixture was heated under reflux for 3 hours in an atmosphere of nitrogen. It was then cooled, poured onto ice and extracted three times with ether. The extracts were washed with sodium carbonate solution and water, and dried over sodium sulphate. The ether was evaporated off and the residue distilled. Yield: 31 g. (77%); B.P.=86–94°/3×10⁻³, $n_D^{20}$=1.5100.

*Example 3*

A standard solution of ethyl-magnesium bromide in ether (0.16 mole) was evaporated at about 20° under reduced pressure and the residue treated at 0° with 70 ml. of dry tetrahydro-furan. Then 7.84 g. (0.08 mole) of hexyn-(5)-ol-(1) in 20 ml. of dry tetrahydro-furan was added dropwise at 0° and the resulting suspension heated under reflux for 1½ hours. The suspension was chilled to 0° and treated with 0.5 g. of anhydrous cuprous cyanide followed by 6.63 g. (0.025 mole) of 1-bromo-tetradecatriyne-(2,5,8) in 20 ml. of dry tetrahydro-furan, the reaction being carried out under nitrogen now and henceforth. The mixture was stirred and heated under reflux for 18 hours before cooling and pouring into a mixture of 150 ml. of water, 6.6 ml. of concentrated sulphuric acid and ice. The oil was thrice extracted with 100 ml. of diethyl ether and the extracts dried (potassium carbonate and magnesium sulphate) and evaporated to give a residual oil which crystallized on standing. Recrystallization from 100 ml. of light petroleum (B.P. 40–60°) with 5 ml. of ether gave cream coloured plates; M.P. 47.5–50°; yield: 6.1 g. (86.5%). A further recrystallization from 100 ml. of light petroleum (B.P. 40–60°) containing 15 ml. of diethyl ether raised the M.P. of eicosatetrayn-(5,8,11,14)-ol-(1) to 51–52°.

The 1-bromo-tetradecatriyne-(2,5,8) used as starting material can be produced according to the following procedure: To 16 g. of tetradecatriyn-(2,5,8)-ol-(1) (obtained according to the method described in Example 2) in 80 ml. of dry ether and 0.1 g. of pyridine were added dropwise, over ½ hour, 2.72 ml. of phosphorus tribromide in 15 ml. of ether under a stream of nitrogen throughout. The reaction mixture was heated under reflux on a water bath for 3 hours. It was then cooled, poured onto ice and extracted three times with ether. The ether extracts were washed twice with 2-N sodium carbonate solution and twice with water while keeping nitrogen over the solution. The extracts were dried over sodium sulphate, filtered and the ether evaporated off, leaving 18 g. of a brown syrup of crude tetradecatriyn-(2,5,8)-yl bromide, which was used directly for the next stage.

*Example 4*

Under the same conditions as in Example 3, 6.72 g. (0.08 mole) of the diGrignard complex of pentyn-(4)-ol-(1) were condensed with 6.63 g. (0.025 mole) of 1-bromo-tetradecatriyne-(2,5,8) in the presence of anhydrous cuprous cyanide to give, after recrystallization from 100 ml. of light petroleum (B.P. 40–60°) containing 10 ml. of ether, 3.18 g. of buff coloured plates of melting point 46°–48° (yield: 47.5%). A further recrystallization from 50 ml. of light petroleum (B.P. 40°–60°) containing 15 ml. of ether gave cream coloured plates of nonadecatriyn-(4,7,10,13)-ol-(1); M.P. 50.5°–52.5°.

A solution of 7.22 g. (0.0269 mole) of the above compound containing 0.05 ml. of dry pyridine was stirred under nitrogen and treated dropwise with a solution of 0.94 m. (0.01 mole) of phosphorus tribromide in 10 ml. of dry diethyl ether at a rate sufficient to maintain a gentle reflux. The solution was further heated under reflux for 3 hours, cooled and poured into ice/water and extracted thrice with 75 ml. of diethyl ether. The extracts were combined, washed twice with 50 ml. of 2-N sodium carbonate, then with 50 ml. of water, dried and evaporated, the working up being conducted in a nitrogen atmosphere. There were obtained 6.52 g. of the crude 1-bromo-nonadecatetrayne-(4,7,10,13), which was not distilled. It solidified after storing under nitrogen at −15°, but softened slowly on standing at about 20°. It was used without further purification for the next step, quantities being calculated on the assumption that it was in fact pure.

1.44 g. (0.06 mole) of magnesium in 20 ml. of dry ether was treated with 1.54 ml. (0.02 mole) of ethyl bromide in 20 ml. of dry ether in the usual way to form ethyl-magnesium bromide. Before the reaction had died down it was treated, with stirring and sufficient heat to maintain a gentle reflux, with a mixture of 6.52 g. (about 0.02 mole) of crude 1-bromo-nonadecatetrayne-(4,7,10,13) and 1.54 ml. (0.02 mole) of ethyl bromide in 50 ml. of dry diethyl ether over ¼ hour. Heating and stirring were continued for a further 6 hours (not under nitrogen) and the mixture was carbonated by pouring onto a slurry of dry ether and crushed solid carbon dioxide. When the mixture had warmed to about 20°, it was treated with ammonium chloride solution (containing 10 g. ammonium chloride) (under nitrogen from now on) and extracted with diethyl ether. The combined ether solutions were extracted thrice with 50 ml. of 2-N ammonia containing sodium chloride to inhibit emulsification, and the ammonia extracts back-washed with 50 ml. of diethyl ether and acidified to Congo red with 6-N sulfuric acid. The diethyl ether extracts (3 x 75 ml.) of this solution were dried and evaporated to give 1.73 g. of a crude crystalline solid. This was extracted with boiling light petroleum (B.P. 60–80°; 1 x 50 ml. and 1 x 25 ml.) and the extracts chilled to −15°. The precipitated solid was collected, washed with a little cold light petroleum (B.P. 40–60°) and dried in vacuo (0.57 g.). Recrystallization from methanol (10 ml.) gave light brown crystals (0.35 g.; 4.4% from the starting material); M.P.=79.5°–81.5°, undepressed on admixture with authentic eicosatetrayn-(5,8,11,14)-oic-(1) acid.

The same reaction can be performed with 1-chloro-nonadecatetrayne-(4,7,10,13), which can be obtained as follows:

A solution of 4.69 g. (0.0175 mole) of nonadeca-tetrayn-(4,7,10,13)-ol-(1) in 50 ml. of dry diethyl ether containing a few drops of pyridine was stirred under nitrogen and treated dropwise with 0.56 ml. (0.0064 mole) of a solution of phosphorus trichloride in 10 ml. of dry diethyl ether and then heated under reflux for 3 hours. The cooled solution was poured into ice/water. The reaction product was isolated in a manner similar to that for the bromo compound. On distilling in vacuo, the following fractions were obtained.

Fraction 1: yield 0.6 g.; B.P. up to 146°/0.01 mm.; $n_D^{25}$=1.5085;

Fraction 2: yield 0.66 g.; B.P. 146–148°/0.01 mm.; $n_D^{25}$=1.5095;

Middle cut of fraction 2: yield 0.29 g.

M.P. 7–9°; $n_D^{25}$=1.5095;

Calculated (for $C_{19}H_{23}Cl$): C, 79.6; H, 8.0; Cl, 12.4%; Found: C, 80.1; H, 8.0; Cl, 12.5%

The ultraviolet spectrum at a concentration of 232 mg./l. in ethanol showed a maximum at 271 mμ; ε=540.

Having now particularly described and ascertained the nature of our said invention and in what manner the same is to be performed, we declare that what we claim is:

1. A compound of the general formula

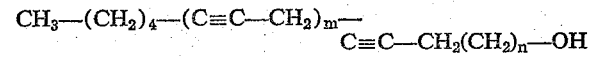

wherein *m* represents an integer of from 2 to 4 and *n* represents an integer of from 0 to 8.

2. A compound of the general formula

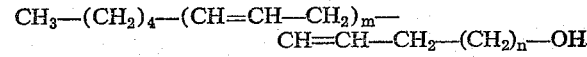

wherein *m* represents an integer of from 2 to 4 and *n* represents an integer of from 0 to 8.

3. Tetradecatriyn-(2,5,8)-ol-(1).
4. Eicosatetrayn-(5,8,11,14)-ol-(1).
5. Nonadecatetrayn-(4,7,10,13)-ol-(1).

References Cited in the file of this patent

UNITED STATES PATENTS

| | | |
|---|---|---|
| 2,855,441 | Sondheimer | Oct. 7, 1958 |
| 2,884,464 | Kurtz | Apr. 28, 1959 |

OTHER REFERENCES

Fieser et al.: Organic Chemistry (2nd Ed.), pp. 147–8 and 167 (1950).

Kharasch et al.: Grignard Reactions of Nonmetallic Substances, pp. 1053–4 (1954).

Klenk et al.: Chem. Abstracts, vol. 49, pp. 9699–9700 (1955).

Bohlmann et al.: Ber. Deut. Chem., vol. 89, p. 1315 (1956).

UNITED STATES PATENT OFFICE
CERTIFICATE OF CORRECTION

Patent No. 3,031,512 April 24, 1962

John Mervyn Osbond et al.

It is hereby certified that error appears in the above numbered patent requiring correction and that the said Letters Patent should read as corrected below.

Column 1, line 38, the formula should appear as shown below instead of as in the patent:

$$CH\equiv C-CH_2-(CH_2)_n-OH$$

Signed and sealed this 27th day of November 1962.

(SEAL)
Attest:

ERNEST W. SWIDER
ESTON G. JOHNSON
Attesting Officer

DAVID L. LADD
Commissioner of Patents